US007212905B2

(12) United States Patent
Grill

(10) Patent No.: US 7,212,905 B2
(45) Date of Patent: May 1, 2007

(54) METHOD FOR OPERATING A MOTOR VEHICLE

(75) Inventor: Michael Grill, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 464 days.

(21) Appl. No.: 10/760,370

(22) Filed: Jan. 21, 2004

(65) Prior Publication Data

US 2004/0172186 A1 Sep. 2, 2004

(30) Foreign Application Priority Data

Jan. 21, 2003 (DE) ................................ 103 02 060

(51) Int. Cl.
*G05D 1/00* (2006.01)
*G06F 7/00* (2006.01)
*G06F 17/00* (2006.01)

(52) U.S. Cl. .......................... 701/96; 701/93; 701/117; 180/170

(58) Field of Classification Search .................. 701/96, 701/93, 117; 180/170
See application file for complete search history.

(56) References Cited

U.S. PATENT DOCUMENTS

| | | | | |
|---|---|---|---|---|
| 3,845,397 | A * | 10/1974 | Schulz | 327/70 |
| 4,675,885 | A * | 6/1987 | Gagliardi et al. | 375/360 |
| 5,857,143 | A * | 1/1999 | Kataoka | 455/62 |
| 5,878,026 | A * | 3/1999 | Greenberg et al. | 370/230 |
| 6,381,522 | B1 * | 4/2002 | Watanabe et al. | 701/22 |
| 6,405,257 | B1 * | 6/2002 | Gersht et al. | 709/235 |
| 6,532,414 | B2 * | 3/2003 | Mintz | 701/117 |
| 6,542,808 | B2 * | 4/2003 | Mintz | 701/117 |
| 6,624,782 | B2 | 9/2003 | Jocoy et al. | |
| 6,662,141 | B2 * | 12/2003 | Kaub | 702/181 |
| 6,754,177 | B1 * | 6/2004 | Gersht et al. | 370/233 |
| 6,789,015 | B2 * | 9/2004 | Tsuji et al. | 701/301 |
| 6,807,159 | B1 * | 10/2004 | Shorey et al. | 370/318 |
| 6,874,032 | B2 * | 3/2005 | Gersht et al. | 709/235 |
| 6,934,580 | B1 * | 8/2005 | Osorio et al. | 600/545 |
| 7,107,606 | B2 * | 9/2006 | Lee | 725/87 |
| 7,113,988 | B2 * | 9/2006 | Chirashnya et al. | 709/224 |
| 2002/0019870 | A1 * | 2/2002 | Chirashnya et al. | 709/224 |
| 2002/0056007 | A1 * | 5/2002 | Gersht et al. | 709/235 |
| 2002/0077742 | A1 * | 6/2002 | Mintz | 701/117 |

(Continued)

FOREIGN PATENT DOCUMENTS

DE 197 43 958 4/1999

(Continued)

OTHER PUBLICATIONS

Favilla et al., Fuzzy Traffic Control: Adaptive Stategies, Mar. 1993, pp. 506-511.*

(Continued)

*Primary Examiner*—Cuong Nguyen
(74) *Attorney, Agent, or Firm*—Walter Ottesen

(57) ABSTRACT

In a method for operating a motor vehicle, a target region is determined which is disposed forward of the motor vehicle and an operating recommendation (36) is outputted to the driver in dependence upon the detection. An arrival probability (PCOL) of the motor vehicle at the target region can be determined and the operating recommendation (36) is outputted to the driver when the arrival probability (PCOL) reaches at least a limit value (PLIM) (42).

11 Claims, 6 Drawing Sheets

U.S. PATENT DOCUMENTS

| | | | | |
|---|---|---|---|---|
| 2002/0082767 A1* | 6/2002 | Mintz | ......................... | 701/117 |
| 2002/0175292 A1* | 11/2002 | Whitehouse et al. | ....... | 250/394 |
| 2004/0172186 A1* | 9/2004 | Grill | ........................... | 701/96 |
| 2005/0228461 A1* | 10/2005 | Osorio et al. | ................. | 607/45 |

FOREIGN PATENT DOCUMENTS

| | | |
|---|---|---|
| DE | 198 02 706 | 7/1999 |
| EP | 1 195 669 | 4/2002 |
| EP | 1245443 A2 * | 10/2002 |
| GB | 2 279 841 | 1/1995 |
| JP | 09224283 A * | 8/1997 |

OTHER PUBLICATIONS

Dickinson et al., An evaluation of microwave vehicle detection at traffic signal controlled intersections, May 1990, pp. 153-157.*

* cited by examiner

| RD / PDIS | HWY | NRD | CIT |
|---|---|---|---|
| PDIS, T | PT1 | PT2 | PT3 |
| PDIS, S | PS1 | PS2 | PS3 |

METHOD FOR OPERATING A MOTOR VEHICLE

CROSS REFERENCE TO RELATED APPLICATION

This application claims priority of German patent application no. 103 02 060.8, filed Jan. 21, 2003, the entire content of which is incorporated herein by reference.

FIELD OF THE INVENTION

The invention relates to a method for operating a vehicle wherein a target region, which is disposed ahead of the vehicle, is determined and an operator recommendation can be outputted to the driver in dependence upon the detection.

The invention also relates to a computer program, a control apparatus (open loop and/or closed loop) as well as a motor vehicle.

BACKGROUND OF THE INVENTION

A method of the type referred to initially herein is known in the marketplace. In the known method, the region, which lies forward of the vehicle, is scanned in accordance with the radar principle. A minimum distance to an object, which is disposed forward of the vehicle, is defined in dependence upon the inherent speed of this vehicle. If it is determined by the radar device that there is a drop below this minimum distance, a warning indication is outputted to the driver. In a further development of the known system, even a braking intervention takes place. The known method functions to relieve the driver, for example, during expressway travel in that the vehicle automatically maintains a specified distance to a vehicle driving ahead.

German patent publication 198 02 706 A1 discloses a system wherein the position of the accelerator pedal, which is necessary to reach a pregiven speed, is provided in a touch-sensitive manner by means of an active accelerator pedal. Furthermore, reference is made to German patent publication 197 43 958 A1 wherein an active accelerator pedal is described which recommends a specific strategy in a touch-sensitive manner to the driver of a vehicle in order to react to driving situations to be expected.

SUMMARY OF THE INVENTION

It is an object of the invention to so improve a method of the kind described initially herein that, with this method, in as many driving situations as possible, corresponding data can be outputted to the driver. With this data, the driver is to be directed to an especially consumption-saving manner of driving.

The method of the invention is for operating a motor vehicle and includes the steps of: determining a target region (TR) forward of the motor vehicle; providing an operating recommendation to the driver in dependence upon the determination of the target region (TR); determining an arrival probability (PCOL) at the target region (TR); and, outputting the operating recommendation to the driver when the arrival probability (PCOL) at least reaches a first limit value (PLIM).

In the method of the invention, it is considered that a certain probability is present that a target region, which is disposed forward of the vehicle, "vanishes" before the own motor vehicle has arrived there. For example, in the simplest case, a slower vehicle, which is traveling ahead, can turn to the right or the left. In this case, the own motor vehicle would never arrive at the target region. This is considered with the probability consideration provided in accordance with the invention. In this way, unnecessary deceleration operations are avoided which increase fuel consumption because of the then required renewed acceleration and which affect the acceptance of such an outputted operator recommendation by the operator of the motor vehicle.

The target region can be an object or it can lie between motor vehicle and object at a specific distance from the object. The object here can be a motor vehicle, a traffic sign, a traffic light, a pedestrian or the like.

It is suggested that the probability of arrival is determined by means of at least a probability density. The term "probability density" is known from quantum physics. The probability density is empirically determined for the method of the invention. With the use of a probability density, the probability that the target region vanishes within a travel window and/or time window can be estimated with high precision.

Here, it is especially preferred when the probability density is dependent upon the type of roadway on which the motor vehicle is located. In this way, it is considered that there are, for example, often changes of lane in expressway traffic and therefore the probability is relatively high that the target region still vanishes. Also, in city traffic, there are many possibilities for turning to the left or right which likewise influence the probability density. On country roads, in contrast, the probability is very low that a vehicle traveling ahead leaves the road. The probability density is therefore in this case primarily dependent upon the probability that there will be a passing maneuver.

For the probability density for the type of roadway "expressway", the duration of an average passing maneuver, for example, can be estimated to a specific time duration. The probability density that the passing lane is again free is then at the inversion of this value. For the probability density, also the probability of the occurrence of expressway exits and the like can be considered. When it is detected in which lane the vehicle is located, no operator recommendations should be outputted when the vehicle travels in the right travel lane. Otherwise, it must be taken into account that the driver changes lanes already with the output of the operator recommendation and in this way unnecessarily hinders the flow of traffic.

With an obstacle in the passing lane, the probability density can be selected in dependence upon the speed of the target region while assuming that the passing maneuver takes place ever more rapidly with increasing speed. It is also possible to configure the probability density in dependence upon the speed difference between passing vehicle and passed vehicle. When, with a corresponding sensor means, a plurality of vehicles traveling ahead can be detected, then strings of vehicles can be detected in the passing lane. With such strings of vehicles, it can be assumed that they will not clear the lane so fast. In this case, the probability density can be correspondingly reduced.

For the data set "city traffic", this means that slow target objects will clear the path most often via turnoff operations. The probability that a vehicle turns off is also dependent upon the travel distance covered which can be expressed in a corresponding distance-based probability density. The probability density can also be dependent upon the next-coming turnoff possibilities. Data as to traffic lights and right of way rules can be also considered in the probability density.

For the data set "country road", the distance-based probability density plays, more likely, a subordinated role. The greatest probability for a clear further travel results from the passing probability. This results, in turn, as the product of a probability of a passing possibility and the willingness of the driver to pass which can, for example, be learned adaptively. The probability of a passing possibility can be estimated from the roadway to be travelled and the density of the oncoming traffic. Traffic signs can also be considered as well as, if needed, also the time of day which has an influence on the traffic density.

It is especially advantageous when the type of roadway on which the motor vehicle is traveling is determined by means of satellite navigation, telemetry and/or radar. Data, for example, as to the oncoming traffic, turnoff possibilities, right of way rules and the like can also be determined in this way.

If the time, which would be necessary to reach the target at undiminished speed, is at most the same as a second limit value, the operating recommendation is outputted to the driver independently of a probability of arrival. In this way, it is considered that target regions or obstacles can be present which suddenly occur ahead of a motor vehicle (for example, a sudden cutting-in-front by another vehicle). A typical second limit value lies at approximately 4 to 8 seconds.

In an advantageous configuration of the method of the invention, it is also suggested that the probability of arrival is determined when the time, which would be needed at an undiminished speed to reach the target region, is at most equal to a third limit value and/or when the distance of the vehicle to the target region is at most equal to a fourth limit value. In this way, psychological aspects between man and machine are more likely considered. Many drivers of a motor vehicle will accept an operating recommendation only when the arrival can still be planned ahead or can be foreseen by them to a certain extent. Furthermore, with a corresponding time window, a special characteristic of expressway traffic is considered which comprises that a driving strategy which is too defensive can provoke other drivers to cut in.

It is especially advantageous when the first limit value is dependent upon a driver-dependent influence factor. In this way, the personal wishes of the user of the vehicle can be considered.

That method goes in the same direction wherein all limit values are dependent upon a single driver-dependent influence factor. This permits a simple adaptation of the method of the invention to the personal characteristics and wishes of the individual driver. The influence factor can be manually adjusted or can be learned from the driving behavior of the driver of the motor vehicle.

In a further embodiment, it is suggested that the driver-dependent influence factor can assume a value from (a) to (b). The outputted operating recommendation leads for an influence factor equal to (a) to an optimization of the fuel consumption and for an influence factor equal to (b), leads to an optimization of the driving time. In this way, and with a single parameter, a point can be adjusted in the target-conflict triangle of comfort, consumption and time corresponding to the personal wishes of the individual driver.

Here, it is especially advantageous when the operating recommendation to the driver includes a recommendation to release the accelerator pedal. The operating recommendation can be a touch-sensitive signal at an operator-controlled element of the motor vehicle, especially, at the accelerator pedal and/or at a steering wheel.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
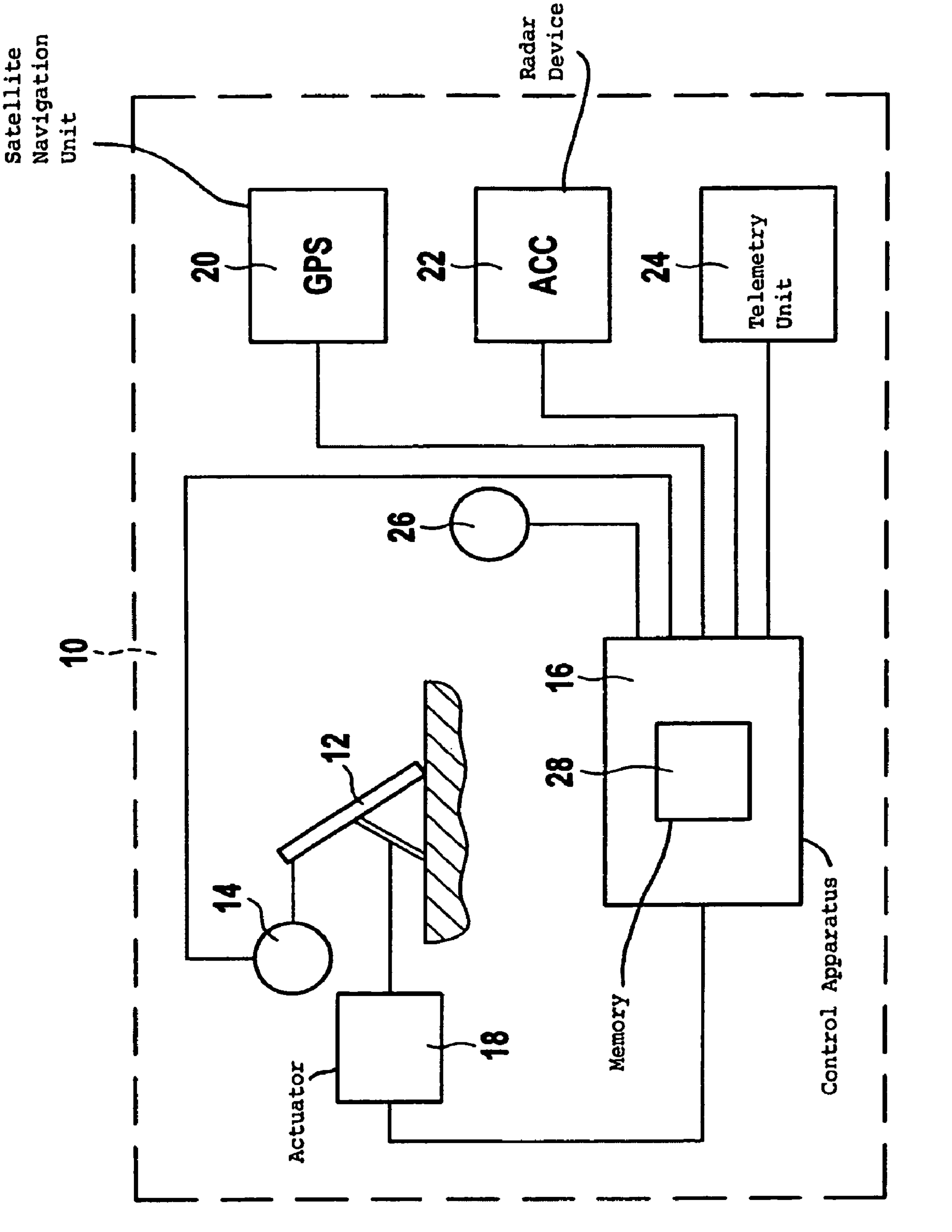
FIG. 1 is a schematic of a system with which operating recommendations can be outputted to a driver of a motor vehicle.

A vehicle is shown only symbolically in FIG. 1 by a broken line and is identified by reference numeral 10. The power of the motor vehicle 10 is adjusted via an accelerator pedal 12 whose position is tapped by a sensor 14. The sensor conducts corresponding signals to a control apparatus (open loop and closed loop) 16. The accelerator pedal 12 is connected to an actuator 18 which is driven by the control apparatus 16. A touch-sensitive signal can be applied to the accelerator pedal 12 by the actuator 18 and this signal is felt by the driver of the motor vehicle 10. This will be discussed in greater detail hereinafter.

The control apparatus 16 is further connected to a satellite navigation unit 20 and a radar unit 22. A telemetry unit 24 also supplies corresponding signals to the control apparatus 16. Furthermore, the speed is detected by means of a sensor 26. The units 20 to 26 function to transmit data to the control apparatus 16 as to the roadway on which the motor vehicle 10 is just then traveling and as to the precise position of the roadway as well as to the actual traffic situation. This too will be discussed in greater detail hereinafter.

Figure 2:
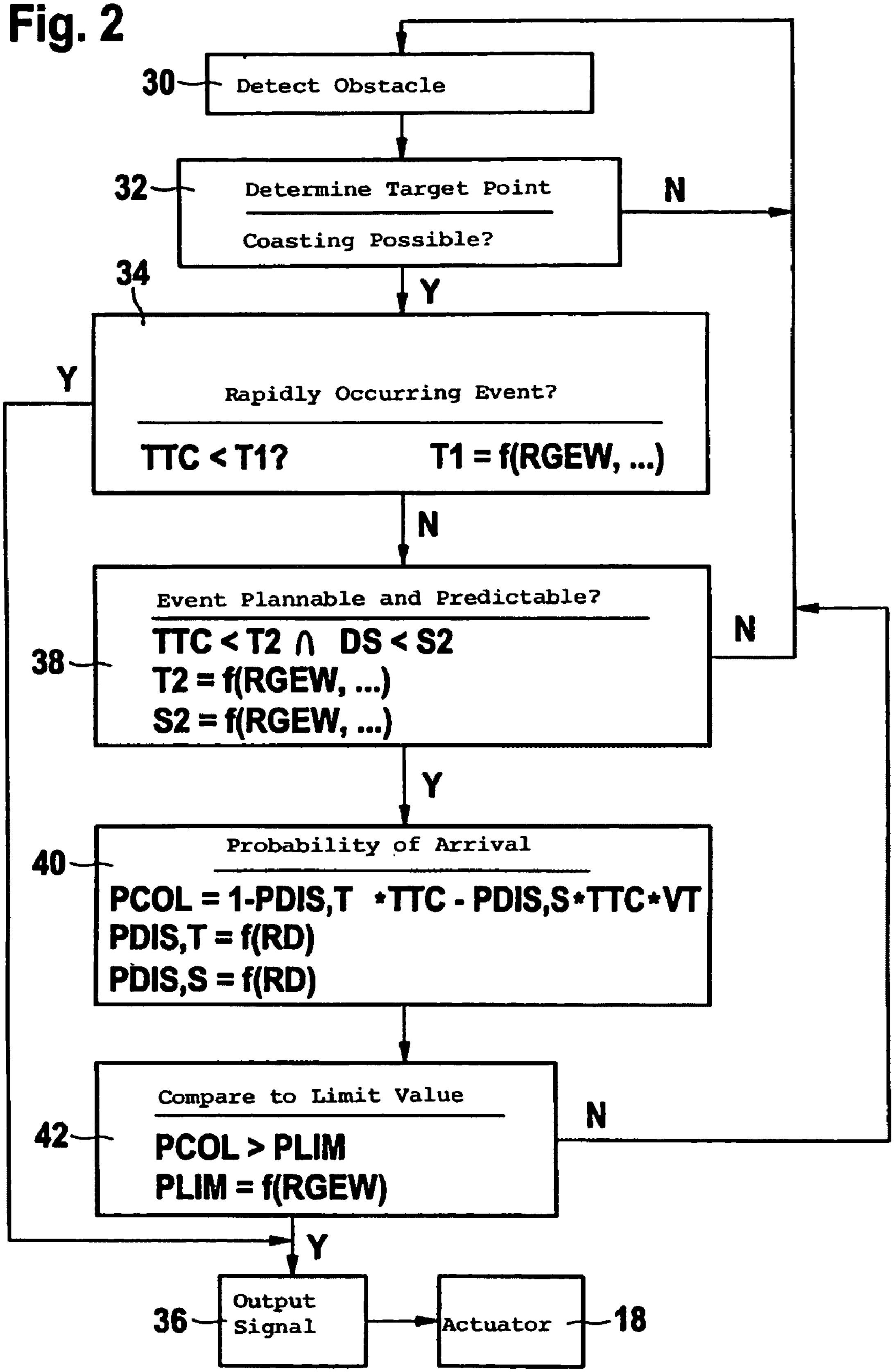
FIG. 2 is a flowchart of a method for a probability-based output of operating recommendations with which the system of FIG. 1 can be operated.

The processing of the signals from the units 20 to 26 and the output of a touch-sensitive signal at the accelerator pedal takes place in dependence thereon in accordance with a method which is stored in the form of a computer program on a memory 28 of the control apparatus 16. By means of this method, the driver of the motor vehicle 10 can be directed to an especially fuel-saving way of driving which is nonetheless favorable with respect to time. The method is discussed in detail hereinafter with reference especially to FIG. 2.

In block 30, an obstacle is detected which is located ahead of the motor vehicle 10. For this purpose, the signals of the radar device 22 are, for example, evaluated. Thereupon, in block 32, a target region is determined. This target region lies at a specific safety distance to the obstacle between the detected obstacle and the motor vehicle 10. Furthermore, in block 32, a determination is made as to whether the target region can be reached with a coasting operation utilizing overrun cutoff (alternatively, a check could, for example, be made as to whether the target region could be reached with a coasting in a free run or idle with a switched-off engine; in future hybrid drives, corresponding strategies are likewise conceivable). If this is not the case, then the program moves back to block 30.

If the answer in block 32 is "yes", then a check is made in block 34 as to whether the obstacle has suddenly appeared and whether this therefore is a "rapidly occurring event". In this way, situations are covered which occur so rapidly that an operating recommendation to the driver can be directly understood by the driver. This is, for example, the case with a sudden cut-in of another vehicle. In addition, safety-critical situations are herewith covered.

For this purpose, a time TTC is first computed which would be necessary for an undiminished speed of the motor vehicle 10 to reach the target region. If this computed time TTC is less than a limit value T1, then an operating recommendation is outputted to the driver immediately in block 36. The limit value T1 is dependent upon an influence quantity RGEW which can be either selected freely by the driver or can be learned by the control apparatus 16 based on the driving behavior in the past.

Figure 3:
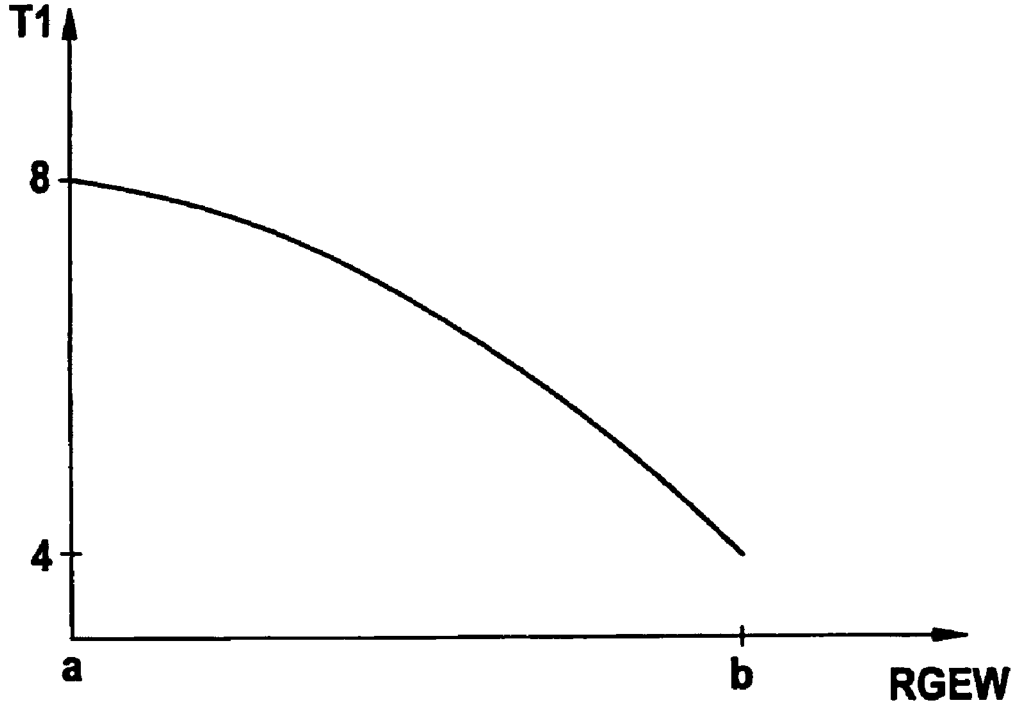
FIG. 3 is a diagram in which a limit value T1 is plotted as a function of an influence factor RGEW.

A possible dependency of the limit value T1 on the influence quantity RGEW is shown in FIG. 3. The influence quantity RGEW can assume a value from (a) to (b). For a value equal to (a), the method set forth in FIG. 2 leads to a consumption-optimal way of driving and, for a value equal to (b), to a time-optimal (sporty) way of driving.

Figure 4:
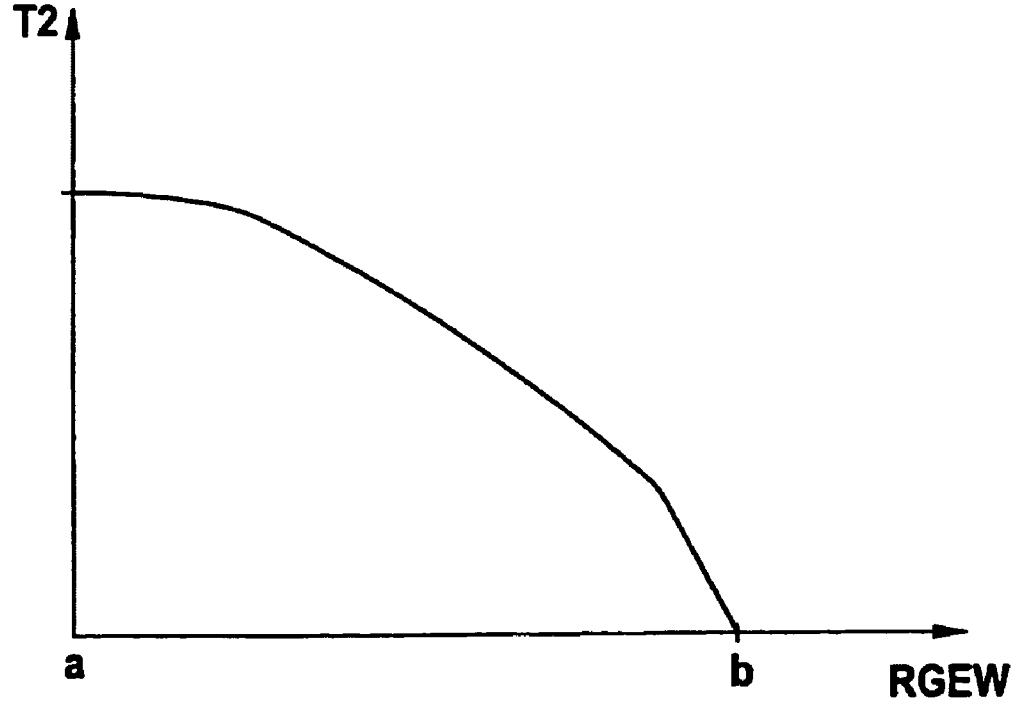
FIG. 4 is a diagram showing a limit value T2 plotted as a function of the influence factor RGEW.
Figure 5:
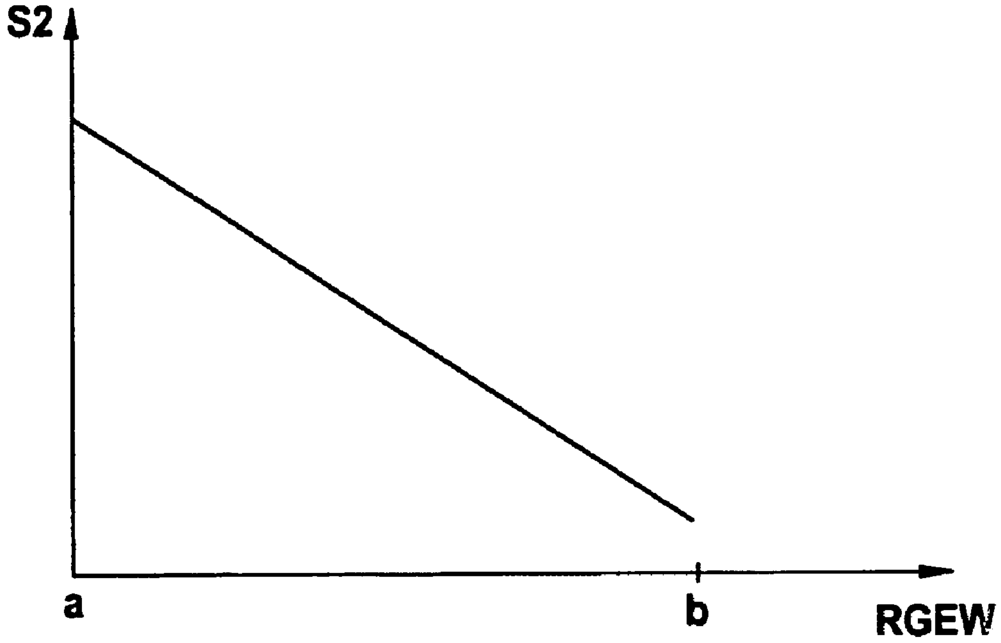
FIG. 5 is a diagram showing a limit value S2 plotted as a function of the influence factor RGEW.

If the obstacle, which is detected in block 30, has not appeared suddenly, then a check is made in block 38 as to whether the occurrence was plannable or foreseeable. For this purpose, the time value TTC, which is determined in block 34, is compared to a limit value T2 and the distance DS between the motor vehicle 10 and the lying-ahead obstacle is compared to a limit S2. The two limit values T2 and S2 are also dependent upon the influence quantity RGEW. Corresponding dependencies are shown in FIGS. 4 and 5.

If the event lies within the time window T2 and within the path window S2, an arrival probability PCOL of the motor vehicle 10 at the target region is determined in block 40. For this purpose, a time-based probability density PDIS,T and a path-based probability density PDIS,S is used. The arrival probability PCOL results from the following formula:

$$PCOL=1-PDIS,T*TTC-PDIS,S*TTC*VT.$$

wherein: VT is the speed of the target region.

The probability densities PDIS depend, inter alia, on the type of roadway on which the motor vehicle 10 is just then traveling. For example, one would distinguish between expressways HWY, country roads NRD and city streets CIT (see FIG. 7). Even though this is not shown, additional influence quantities participate, for example, the lane on an expressway on which the motor vehicle 10 is disposed, the duration which has passed since the obstacle was detected for the first time and other variables.

The arrival probability PCOL, which is determined in block 40, is compared to a limit value PLIM in block 42. Only when the arrival probability PCOL (that is, the probability that the motor vehicle 10 arrives at the target region with undiminished speed) is greater than the limit value PLIM, the output of a touch-sensitive signal at the accelerator pedal 12 is initiated in block 36. Here too, the limit value PLIM is dependent upon the driver-individual influence quantity RGEW. A typical dependency is shown in FIG. 6.

Figure 6:
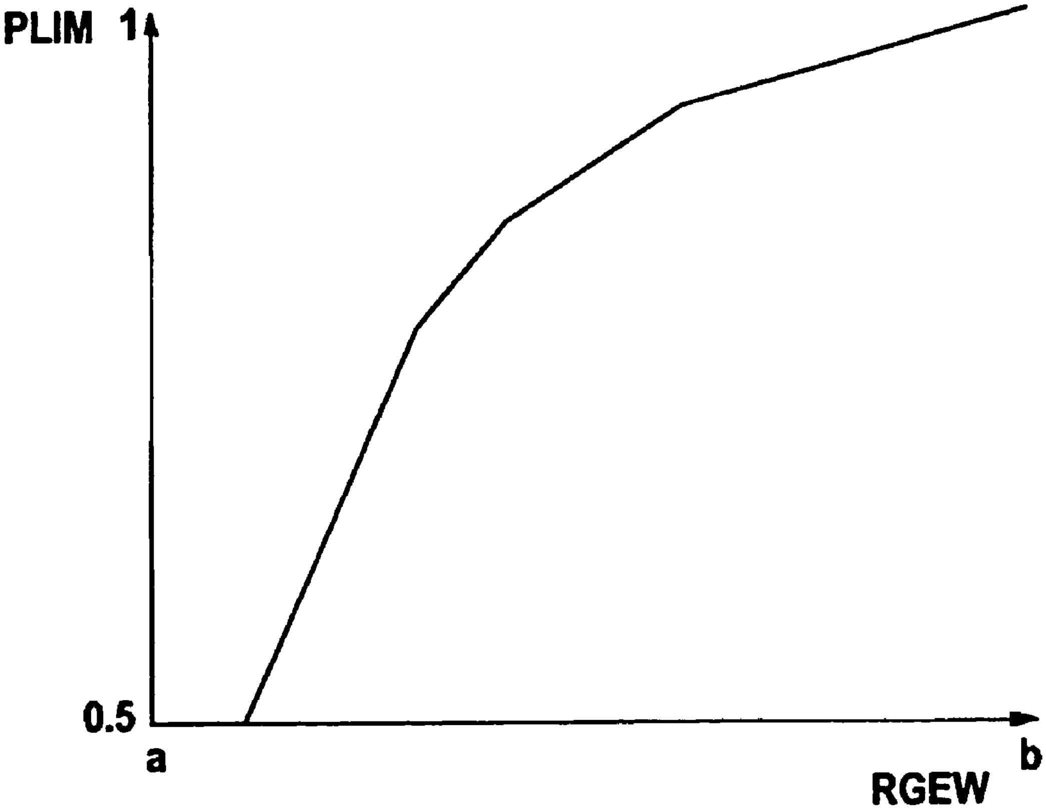
FIG. 6 is a diagram showing a limit value PLIM plotted as a function of the influence factor RGEW.

The comparison in block 42 and the diagram in FIG. 6 are based on the following thought. When the vehicle 10 approaches the target region, the time TTC becomes ever less. In this way, the arrival probability PCOL increases linearly. Here, starting from an arrival probability of 50%, it appears to be purposeful that no further fuel is injected. If one would output a corresponding touch-sensitive signal already for an arrival probability PCOL of less than 50%, then the danger would be present that, viewed statistically, one would unnecessarily decelerate too often.

Under the aspect of a time-optimal mode of driving, it can be purposeful to not yet decelerate for an arrival probability of more than 50%.

Figures 7, 8:
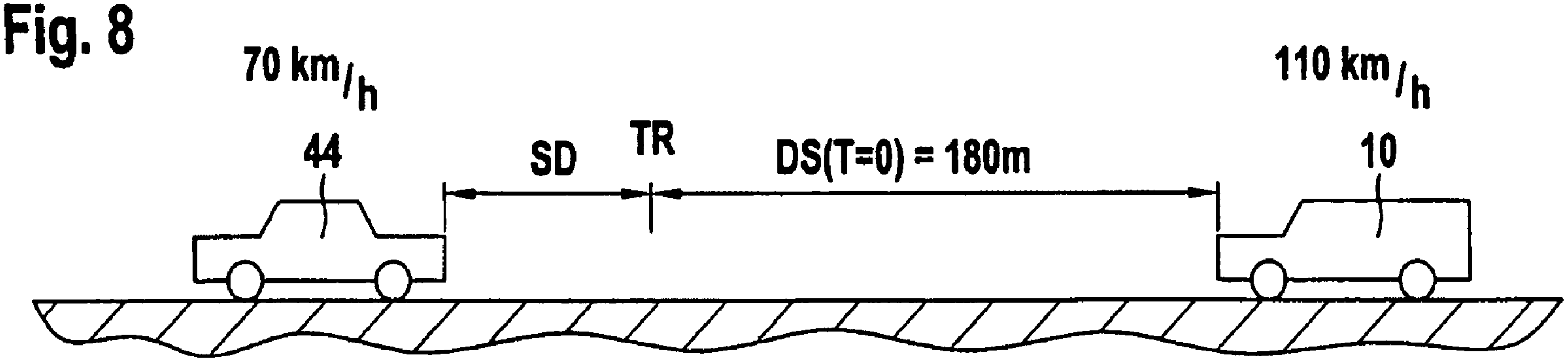
FIG. 7 is a table showing data sets of probability densities for various types of roadway.
FIG. 8 is a schematic showing a driving situation of two motor vehicles.
Figure 9:
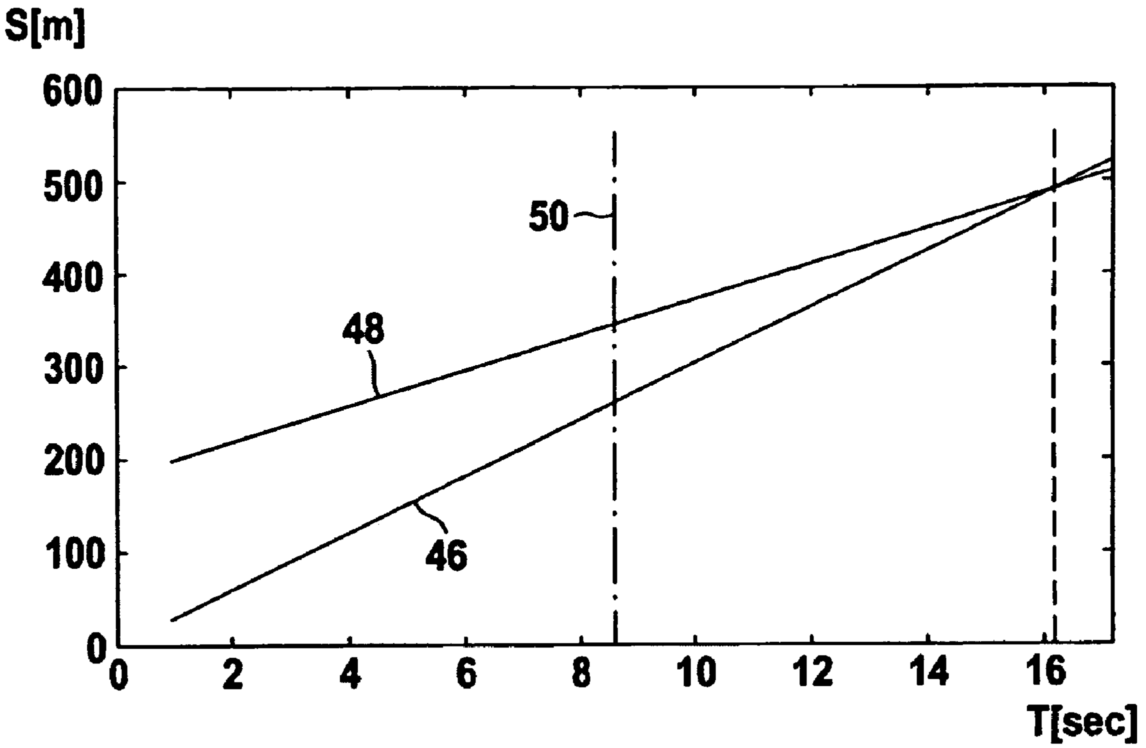
FIG. 9 is a diagram wherein the distance of the two vehicles of FIG. 8 is plotted as a function of time; and, FIG. 10 is a diagram wherein a probability of arrival of the following vehicle of FIG. 8 is plotted as a function of time.
Figure 10:
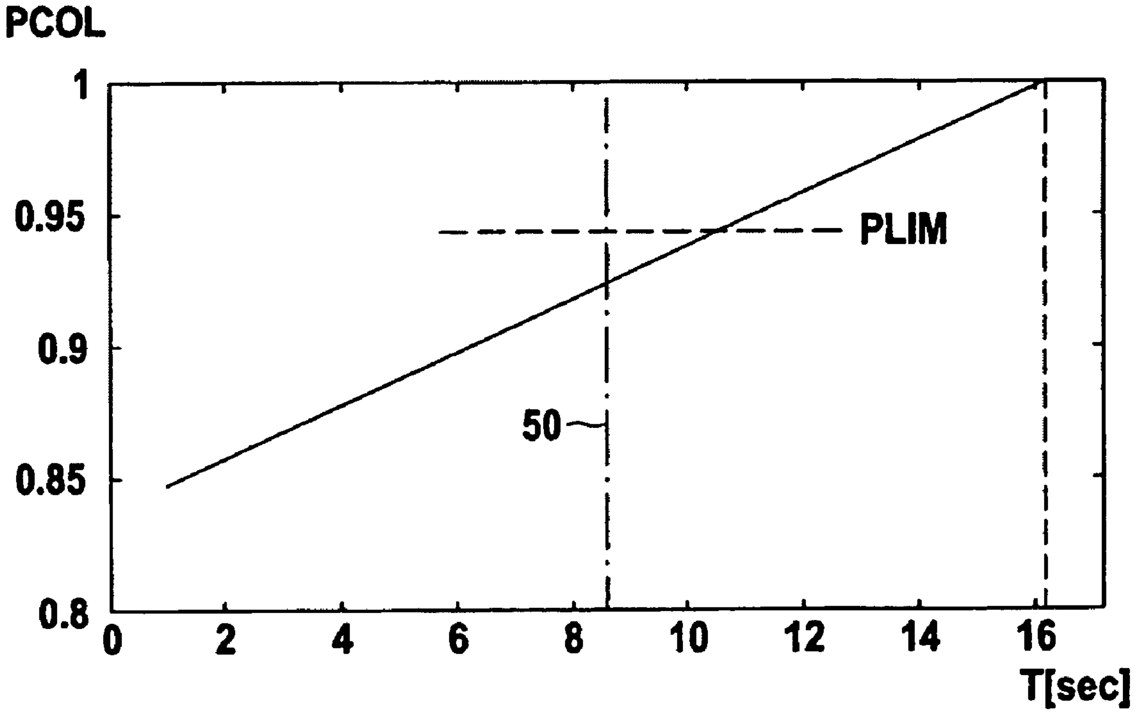

In FIGS. 8, 9 and 10, a specific example for a driving situation is shown. A slower motor vehicle, which travels ahead of the motor vehicle 10, is identified by reference numeral 44. The target region TR lies between the two vehicles 10 and 44 at a safety distance SD from the traveling-ahead slower vehicle 44. The distance DS of the motor vehicle 10 to the target region TR is 180 meters at time point T=0 of the first detection of the vehicle 44 by the corresponding device of motor vehicle 10. The motor vehicle 10 travels at a speed of 110 km/h and the traveling-ahead motor vehicle 44 travels at a speed of 70 km/h.

The positions of the two vehicles 10 and 44 are plotted as a function of time in FIG. 9. The curve for the vehicle 10 is identified by reference numeral 46 and the curve for the vehicle 44 by reference numeral 48. The arrival probability PCOL is plotted in FIG. 10 as a function of time. A dot-dash line identified by reference numeral 50 shows the time point starting from which the trailing motor vehicle 10 could reach the target region TR with overrun cutoff, that is, the motor vehicle 10 would coast up to a safety distance SD to the traveling-ahead vehicle 44. At this time point, the arrival probability PCOL is approximately 0.925. For the embodiment assumed here, a limit value PLIM of 0.94 is assumed. Just 6 seconds ahead of reaching the target region under the assumption of undiminished speed of the motor vehicle 10 (and of the motor vehicle 44), a recommendation is outputted to the driver via the accelerator pedal 12 to release the foot from the accelerator pedal.

One recognizes that with the determination of the arrival probability PCOL in dependence upon the type of roadway on which the motor vehicles 10 and 44 are just then traveling and in dependence upon a single influence quantity RGEW, an operating recommendation can be outputted to the driver which, on the one hand, considers the individual wishes of the driver and, on the other hand, considers the ambient conditions under which the motor vehicle 10 is operated. In this way, an optimal compromise can be found in the target conflict triangle of comfort, consumption and driving time.

It is understood that the foregoing description is that of the preferred embodiments of the invention and that various changes and modifications may be made thereto without departing from the spirit and scope of the invention as defined in the appended claims.

What is claimed is:

1. A method for operating a motor vehicle, the method comprising the steps of:

determining a target region (TR) forward of said motor vehicle;

providing an operating recommendation to the driver in dependence upon the determination of said target region (TR);

determining an arrival probability (PCOL) at said target region (TR) when the time (TTC), which would be necessary for reaching said target region (TR) at undiminished speed, is at most equal to a third limit value (T2) and/or when the distance (DS) of said motor vehicle to said target region (TR) is at most equal to a fourth limit value (S2); and, outputting said operating recommendation to said driver when said arrival probability (PCOL) at least reaches a first limit value (PLIM).

2. The method of claim 1, comprising the further step of determining said arrival probability (PCOL) via at least a probability density (PDIS,T, PDIS,S).

3. The method of claim 2, wherein said probability density (PDIS,T, PDIS,S) is dependent upon the type of roadway (HWY, NRD, CIT) on which said motor vehicle is traveling.

4. The method of claim 1, comprising the further step of outputting said operating recommendation to the driver independently of said arrival probability (PCOL) when the time (TTC), which would be necessary for reaching said target region (TR) with undiminished speed, is at most equal to a second limit value (T1).

5. The method of claim 1, wherein said operating recommendation to said driver includes a recommendation to release the accelerator pedal.

6. The method of claim 1, wherein said first limit value (PLIM) is dependent upon a driver-dependent influence factor (RGEW).

7. The method of claim 6, wherein all of said limit values (PLIM, T1, T2, S2) are dependent from a single driver-dependent influence factor (RGEW).

8. The method of claim 7, wherein said driver-dependent influence factor (RGEW) can assume a value from (a) to (b); and, wherein the outputted operating recommendation leads to an optimization of fuel consumption when said influence factor (RGEW) is equal to (a) and leads to an optimization of the driving time when said influence factor (RGEW) is equal to (b).

9. A motor vehicle comprising a control apparatus which is programmed to carry out a method for operating a motor vehicle, the control apparatus including:

means for determining a target region (TR) forward of said motor vehicle;

means for providing an operating recommendation to the driver in dependence upon the determination of said target region (TR);

means for determining an arrival probability (PCOL) at said target region (TR) when the time (TTC), which would be necessary for reaching said target region (TR) at undiminished speed, is at most equal to a third limit value (T2) and/or when the distance (DS) of said motor vehicle to said target region (TR) is at most equal to a fourth limit value (S2); and, means for outputting said operating recommendation to said driver when said arrival probability (PCOL) at least reaches a first limit value (PLIM).

10. A computer program on a tangible medium comprising a program suitable for carrying out a method for operating a motor vehicle when executed on a computer and stored on a storage medium, the method including the steps of:

determining a target region (TR) forward of said motor vehicle;

providing an operating recommendation to the driver in dependence upon the determination of said target region (TR);

determining an arrival probability (PCOL) at said target region (TR) when the time (TTC), which would be necessary for reaching said target region (TR) at undiminished speed, is at most equal to a third limit value (T2) and/or when the distance (DS) of said motor vehicle to said target region (TR) is at most equal to a fourth limit value (S2); and, outputting said operating recommendation to said driver when said arrival probability (PCOL) at least reaches a first limit value (PLIM).

11. A control apparatus for a motor vehicle, said control apparatus comprising:

means for determining a target region (TR) forward of said motor vehicle;

means for providing an operating recommendation to the driver in dependence upon the determination of said target region (TR);

means for determining an arrival probability (PCOL) at said target region (TR) when the time (TTC), which would be necessary for reaching said target region (TR) at undiminished speed, is at most equal to a third limit value (T2) and/or when the distance (DS) of said motor vehicle to said target region (TR) is at most equal to a fourth limit value (S2); and, means for outputting said operating recommendation to said driver when said arrival probability (PCOL) at least reaches a first limit value (PLIM).

* * * * *